United States Patent
Ullman et al.

(10) Patent No.: US 7,158,554 B2
(45) Date of Patent: Jan. 2, 2007

(54) METHODS AND APPARATUS FOR REGENERATING FUELS IN A SOLID GENERATOR CHEMICAL OXYGEN IODINE LASER

(75) Inventors: Alan Zachary Ullman, Northridge, CA (US); David Stelman, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 10/633,072

(22) Filed: Aug. 1, 2003

(65) Prior Publication Data

US 2005/0025209 A1    Feb. 3, 2005

(51) Int. Cl.
  H01S 3/223  (2006.01)
  H01S 3/22   (2006.01)
  H01S 3/095  (2006.01)
(52) U.S. Cl. ............................... 372/59; 372/89
(58) Field of Classification Search ............ 372/89, 372/59
  See application file for complete search history.

(56) References Cited

U.S. PATENT DOCUMENTS

| | | | |
|---|---|---|---|
| 3,863,176 A * | 1/1975 | Martinez et al. | ............ 372/89 |
| 5,693,267 A | 12/1997 | Beshore et al. | |
| 5,837,206 A | 11/1998 | Traffenstedt et al. | |
| 5,903,583 A | 5/1999 | Ullman et al. | |
| 6,366,594 B1 | 4/2002 | Bauer et al. | |
| 6,553,054 B1 | 4/2003 | Bauer et al. | |
| 6,674,781 B1 * | 1/2004 | Dickerson et al. | ............ 372/89 |
| 2002/0067752 A1 | 6/2002 | Ullman et al. | |
| 2002/0067753 A1 | 6/2002 | Ullman et al. | |

OTHER PUBLICATIONS

Adon Delgado, Jr., et al., *Phase-Change Heat Exchanger*, U.S. Appl. No. 10/338,539, filed Jan. 7, 2003.

Thomas L. Bunn et al., *Methods and Apparatus for Simultaneous Chlorine and Alkaline-Peroxide Production*, U.S. Appl. No. 10/338,648, filed Jan. 7, 2003.

*Production of Basic Hydrogen Peroxide for Chemical Oxygen-Iodine Laser Devices*, U.S. Appl. No. 10/151,610, filed May 20, 2002.

* cited by examiner

*Primary Examiner*—Armando Rodriguez
(74) *Attorney, Agent, or Firm*—Ingrassia Fisher & Lorenz, P.C.

(57) ABSTRACT

A solid generator laser provides device simplicity and fuel regeneration without relying upon highly-corrosive or unstable fuels. The laser system includes a fuel supply system that provides a solid fuel to a laser. The laser processes the fuel products to produce at least a solid waste product and a gaseous waste product. A fuels regeneration system receives the solid and gaseous wastes at a reagent production system to replenish the fuel products in the fuel supply system. Rather than relying upon corrosive fuels such as BHP, then, the laser suitably processes solid peroxide (e.g. $Na_2O_2$) and a halide (e.g. hydrogen or deuterium halide) to form a salt, water and singlet delta oxygen that may be used to induce a lasing effect. The processes and structures described herein may be used, for example, with chemical oxygen iodine lasers and the like.

32 Claims, 3 Drawing Sheets

METHODS AND APPARATUS FOR REGENERATING FUELS IN A SOLID GENERATOR CHEMICAL OXYGEN IODINE LASER

TECHNICAL FIELD

The present invention generally relates to high energy lasers such as chemical oxygen iodine lasers (COILs). More particularly, various aspects of the present invention relate to laser fuel regeneration systems and lasers incorporating fuels regeneration systems.

BACKGROUND

High energy lasers (HELs) are becoming increasingly used in military applications as well as in industrial settings. HELs are commonly used in industrial processes, for example, to cut metals and other substances. In the military arena, HELs are particularly useful in precision strike (PS) situations where it is desirable to minimize collateral damage. HELs have also been mounted on spacecraft, aircraft, ships and land-based vehicles for other military-related purposes, including missile defense.

One type of laser that is commonly used in military and industrial applications is the chemical oxygen iodine laser (COIL), which is typically a medium to high power laser with a power on the order of about 100 kW or less to a megawatt or more. COIL lasers are conventionally fueled by reacting aqueous basic and hydrogen peroxide solution (BHP) with chlorine gas to form singlet delta oxygen ($O_2(^1\Delta)$) or singlet molecular oxygen that reacts with iodine to produce photon emissions that result in a laser beam. By-products of the conventional lasing process typically include oxygen and a spent BHP solution containing an alkali chloride (e.g. KCl, NaCl, LiCl) or the like.

Although COIL lasers are quite effective in many situations, transportation and handling of the laser fuel chemicals can present logistics issues, particularly if the laser is mobile or stationed in a remote location (e.g. in space). BHP, in particular, can be unstable and highly corrosive, thereby resulting in difficulties in storage and transport. Moreover, BHP can be relatively unstable, meaning that it decomposes relatively quickly. Accordingly, BHP may be an undesirable fuel material for certain types of lasers that require long-term storage of fuel prior to laser firing. Space-based lasers, for example, may remain in orbit for years or decades prior to firing. Because BHP decomposes over time, the BHP must somehow be replenished or regenerated if the laser is to remain available for firing. This process typically consumes electrical power, which can be undesirable, particularly in space where battery-supplied power is relatively limited.

Accordingly, it is desirable to design a laser system that does not require unstable or corrosive materials to operate. In addition, it is desirable to create new techniques for operating and refueling a laser that does not require highly corrosive or unstable materials. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, a solid generator laser provides device simplicity and fuel regeneration without relying upon highly-corrosive or unstable fuels. The laser system includes a fuel supply system that provides a solid fuel to a laser. The laser processes the fuel products to produce at least a solid waste product and a gaseous waste product. A fuels regeneration system receives the solid and gaseous wastes at a reagent production system to replenish the fuel products in the fuel supply system. In contrast to prior art lasers that relied upon corrosive materials such as BHP, the laser may process a solid peroxide (e.g. $Na_2O_2$) and a halide (e.g. hydrogen or deuterium halide) to form a salt, water and singlet delta oxygen that may be used to induce a lasing effect. The processes and structures described herein may be used, for example, with chemical oxygen iodine lasers.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, a chemical oxygen iodine laser (COIL) is appropriately fueled with a metal peroxide (e.g. $Na_2O_2$) and a hydrogen or deuterium halide (e.g. DCl) rather than aqueous BHP and free halogen. Such lasers may be referred to as "solid generator lasers" (SGLs) because the metal peroxide is typically a solid. Although SGLs are typically described herein as reacting sodium peroxide ($Na_2O_2$) with deuterium chloride (DCl), any other metal (e.g. lithium, potassium, rubidium or the like) peroxide could be used in alternate but equivalent embodiments. Similarly, deuterium chloride as described herein could readily be replaced by any hydrogen or deuterium halide such as hydrogen or deuterium fluoride, iodide, bromide or the like in a wide range of equivalent embodiments. Continuing with the example of sodium peroxide and deuterium chloride, however, an exemplary SGL forms a salt, water (e.g. so-called "heavy water") and electronically-excited oxygen in the singlet delta state as follows:

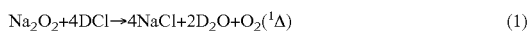

$$Na_2O_2 + 4DCl \rightarrow 4NaCl + 2D_2O + O_2(^1\Delta) \quad (1)$$

This excited state oxygen generally flows into a nozzle of the laser where it reacts with iodine to form an excited state of the iodine atom. As in conventional COIL devices, the singlet delta oxygen may be mixed with an iodine-containing stream to disassociate the iodine into atoms as follows:

$$I_2 + NO_2(^1\Delta) \rightarrow NO_2(\chi) + 2I(\chi) \quad (2A)$$

where ($\chi$) represents a ground-state species. The iodine atoms are appropriately excited by energy transfer from the singlet delta oxygen:

$$I(\chi)+O_2(^1\Delta) \rightarrow O_2(\chi)+I^* \tag{2B}$$

The excited-state iodine atoms then act as a gain medium to produce stimulated photon emissions in a resonator cavity to produce coherent light with a wavelength of about 1.315 µm that can be focused and directed to produce the laser beam:

$$I^*+h\nu \rightarrow I(\chi)+2h\nu \tag{3}$$

By eliminating the need to provide BHP as a fuel to the laser, the problems associated with stability and corrosiveness are appropriately avoided.

Figure 1:
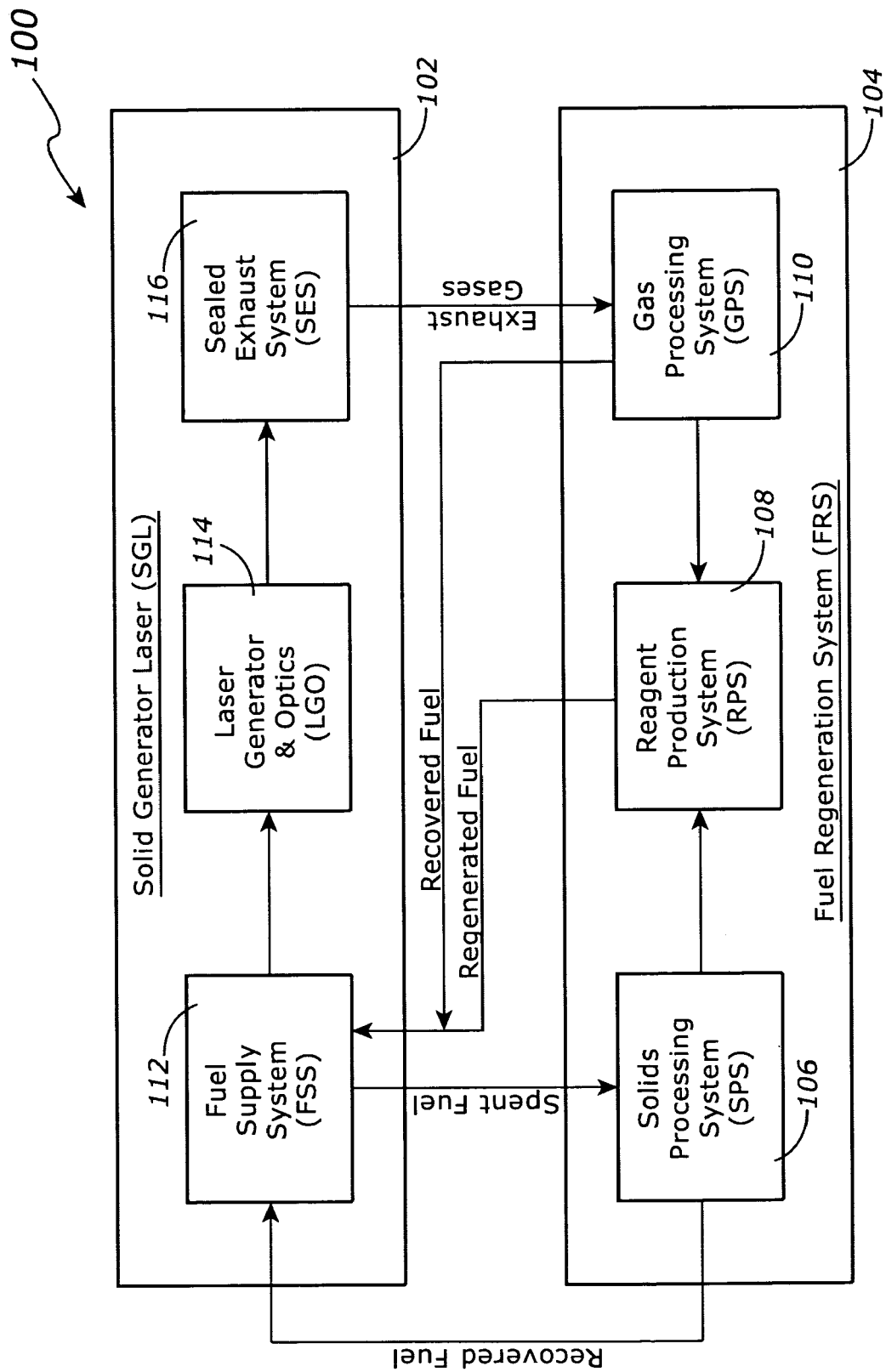
FIG. 1 is a block diagram of a chemical oxygen iodine laser system with a fuel regeneration system.

Turning now to the drawings and with initial reference to FIG. 1, an exemplary laser system 100 suitably includes a solid generator laser (SGL) 102 and a fuel regeneration system (FRS) 104. SGL 102 appropriately receives fuel components as described above and processes the fuel to produce a laser beam. After the laser has fired, fuel products are regenerated by FRS 104 to prepare the laser for subsequent firings. In practice, most fuels will not react completely, so both solid and gaseous product streams may contain both fuels and waste products.

SGL 102 appropriately includes a fuel supply system (FSS) 112, a laser generator and optics (LGO) module 114, and a sealed exhaust system (SES) 116. Each of the various laser components described herein are intended as logical models that describe various functions of the laser. Accordingly, various practical embodiments may combine or separate the various laser functions into physical devices or modules in any appropriate manner.

Fuel supply system 112 is any receptacle or other storage area capable of supplying and managing the various fuel components in a manner such that they are available for firing the laser. In an exemplary embodiment, FSS 112 appropriately includes one or more bins or other stores for solid fuels such as metal peroxides, as well as one or more vessels for storing liquids and/or gaseous fuel components such as hydrogen or deuterium halide, diluent nitrogen ($N_2$), helium (He), iodine and/or other fuels as appropriate.

Laser generator and optics module 114 utilizes the various fuels from FSS 112 to extract a laser beam from a resultant gain medium. In an exemplary embodiment, LGO 114 is a conventional COIL that has been adapted as appropriate to consume solid fuels such as metal peroxides, as described more fully herein.

Sealed exhaust system 116 is any manifold or the like suitably for storing gaseous waste products of the lasing process. In an exemplary embodiment, SES 116 includes a cooled adsorption pump that cools exhaust gases from the laser before the gases are provided to fuel regeneration system 104 for re-processing. In various further embodiments, exhaust system 116 further includes two compartments providing a refrigerated portion and a cryogenic portion, as described below. Alternatively, SES 116 may be replaced with a conventional vacuum pump (e.g. an ejector or mechanical pump) that exhausts laser gases to the ambient rather than regenerating the gases. In still other embodiments, the vacuum of outer space may provide for laser gas exhaust, thereby eliminating the need for a pump. Embodiments that exhaust some or all of the laser gases or otherwise reduce the need for SES 116 should be considered as equivalents to the sealed exhaust system described herein, even though such embodiments typically will provide only partial regeneration of laser fuels, since some portions of the laser waste products and un-reacted fuels are vented away rather than being captured for reprocessing.

Fuels regeneration system (FRS) 104 suitably includes a solids processing system (SPS) 106, a reagent production system (RPS) 108 and a gas processing system (GPS) 110 as appropriate. Each of the sub-systems 106, 108 and 110 suitably receive waste products from the lasing process and regenerate the waste products to restore the various fuels supplied to LGO 114 via FSS 112.

Solids processing system 106 recovers spent or partially spent solid fuels such as metal peroxides mixed with metal halide products. Similarly, gas processing system 110 recovers fuel components and reaction products found in exhaust gases received from SES 116, including hydrogen or deuterium halides, water vapor, oxygen and/or the like. Recovery of fuel components may take place through any filtering or other separating process, as described more fully below. SPS 106 and GPS 110 also provide spent fuel products to RPS 108, which appropriately performs the various chemical processes to regenerate usable laser fuels from the waste products produced by the laser. In one embodiment using sodium peroxide and deuterium chloride as fuel products, the regenerating process is described by the following equation, which is the inverse of equation (1) above:

$$4NaCl+2D_2O+O_2 \rightarrow Na_2O_2+4DCl \tag{4}$$

Similar regenerating processes could be formulated for any type of laser system 100 using any type of solid fuel, such as other metal hydroxides or hydrogen/deuterium halides.

Figure 2:
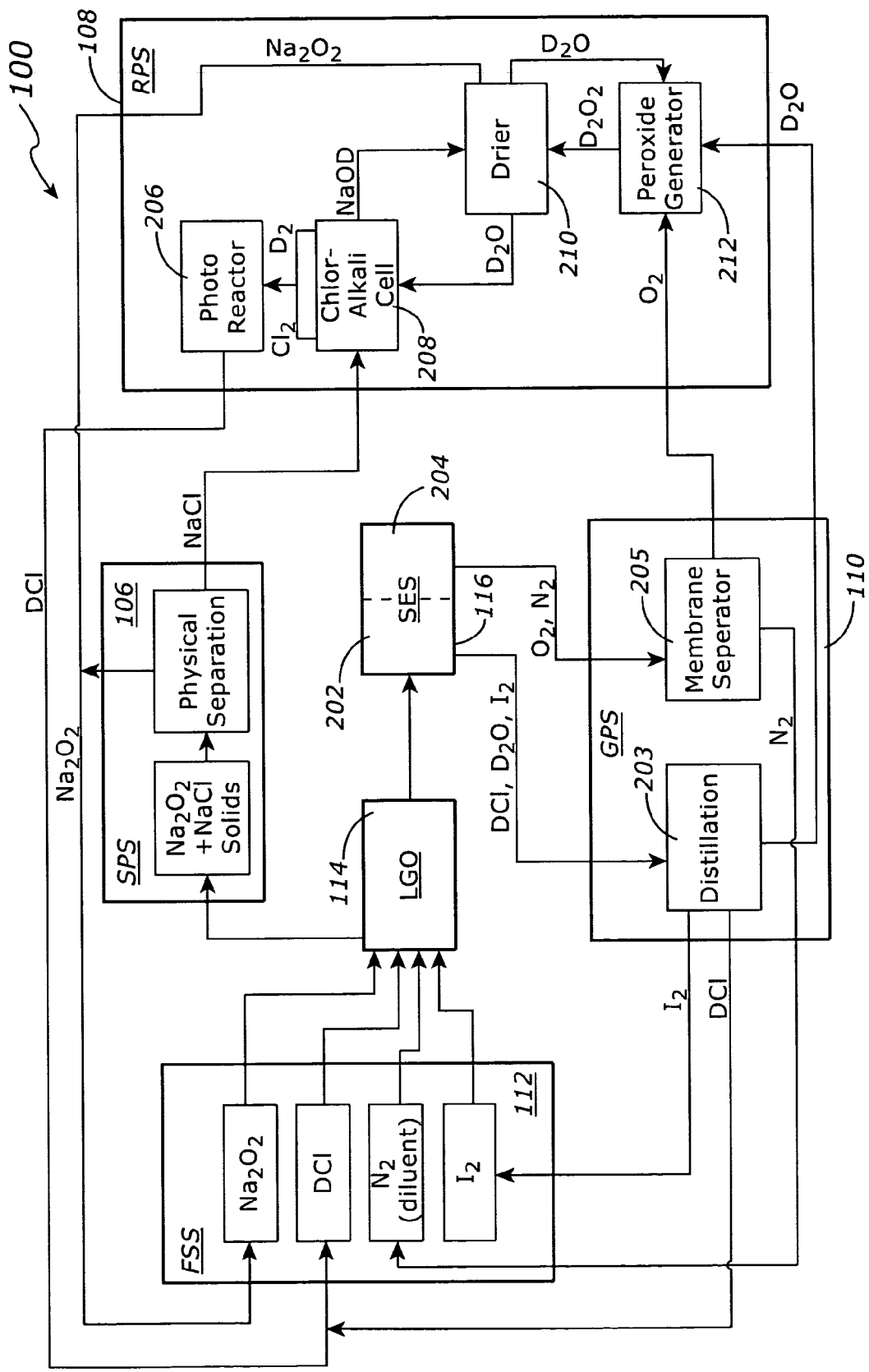
FIG. 2 is a block diagram of a more detailed implementation of a chemical oxygen iodine laser with a fuel regeneration system.

With reference now to FIG. 2, a more detailed implementation of laser system 100 suitably includes various modules processing the various laser fuels and waste products. FSS 112, for example, appropriately stores fuel products such as metal peroxide (e.g. $Na_2O_2$), hydrogen or deuterium halide (e.g. DCl), diluent nitrogen $N_2$) and iodine ($I_2$) in any form. Each of the fuel products are provided to LGO 114 to create a laser beam as appropriate, such as in accordance with equations (1)–(3) above. Solid waste products from the lasing process (e.g. sodium chloride (NaCl)) and unused solid fuels (e.g. $Na_2O_2$) may be provided from LGO 114 to solids processing system 106, as describe above. SPS 106 appropriately separates solid peroxides from the solid halides (e.g. NaCl) generated by the lasing process. Such separation may take place using any technique, including any physical or chemical technique. In an exemplary embodiment, SPS 106 uses density separation of any type to remove the denser halide from the less dense peroxide. In practice, the solids removed from LGO 114 may be in the form of peroxide beads having outer coatings of halide. Accordingly, chemical separation could be used to remove outer layers of halide from the peroxide cores.

Exhaust gases from LGO 114 are provided to SES 116, as appropriate. In an exemplary embodiment, SES 116 contains two separate chambers corresponding to a refrigerated portion 202 and a cryogenic portion 204. Refrigerated portion 202 may be cooled using an adsorption pump or the like to a temperature on the order of −25 degrees C. or so to extract unspent halide and iodine (as well as any water or heavy water) present in the exhaust gases. Similarly, cryogenic portion 204 may be cooled to a temperature on the order of −175 degrees C. or so to effectively extract oxygen ($O_2$) and nitrogen ($N_2$) gases from the laser exhaust. A mechanical vacuum pump (not shown) may also be provided to compress any gases present that are not readily condensed by SES 116 prior to delivery to GPS 110.

Gas processing system (GPS) 110 suitably receives the various gases from SES 116 and separates the various components of the exhaust gas. In the exemplary embodiment shown in FIG. 2, GPS 110 suitably separates gases received from refrigerated portion 202 of SES 116 using distillation 203 or other appropriate techniques. By fractionating the refrigerated gases by temperature, the various components (e.g. $I_2$, DCl, $D_2O$) are separated by temperature and provided to FSS 112 and/or RPS 108 as appropriate. In an exemplary embodiment, iodine and DCl are provided to FSS 112 for subsequent use by laser 114, and water and/or heavy water is provided to RPS 108 for additional processing. Gases received from the cryogenic portion 204 of SES 116 may be separated using a membrane or other filter. Because oxygen is typically more permeable than nitrogen, for example, the two gases can be readily separated and provided to RPS 108 and/or FSS 112. Alternatively, gases from cryogenic portion 204 may be distilled at a very low temperature (e.g. on the order of −275 degrees C. or so). Oxygen may be provided to RPS 108, and nitrogen may be provided to FSS 112 as appropriate.

Reagent production system 108 is any system or collection of components capable of reacting various wastes received from LGO 114 to restore the original fuel materials for the laser. Various embodiments of RPS 108 suitably include a reactor 206, a chlor-alkali cell 208, a peroxide generator 212, and a drier 210. Reactor 206 is any thermal, catalytic or other device capable of facilitating appropriate reactions within RPS 108. In an exemplary embodiment, reactor 206 is a photoreactor. Chlor-alkali cell 208 and peroxide generator 212 may be formed from any material such as glass, plastic or ceramic that is chemically inert, resistive to acidic and basic solutions, and that has a low coefficient of conductivity, similar to conventional chlor-alkali and alkaline-peroxide cells used in COIL implementations based upon BHP fuels. Accordingly, the structures and techniques used in fabricating and operating such cells are readily applicable to SGL system 100.

In embodiments described by equation (4) above, RPS 108 suitably receives NaCl or the like from SPS 106 as well as oxygen and water/heavy water from GPS 110, and processes the various waste components to restore DCl and $Na_2O_2$ fuels for LGO 114. In one embodiment (and as shown in FIG. 2), water and/or heavy water is oxidized at a peroxide generator 212 to produce hydrogen and/or deuterium hydroxide, respectively. Sodium chloride (NaCl) from SPS 106 is simultaneously electrolyzed in a chlor-alkali cell 208 to produce free chlorine ($Cl_2$) and deuterium ($D_2$) that may be combined in a reactor (e.g. photoreactor 206) or the like to produce deuterium chloride (DCl). Chlor-alkali cell 208 also produces sodium hydroxide-d (NaOD) that may be dried in the presence of hydrogen or deuterium peroxide at drier 210 to restore the sodium peroxide used in fueling the laser. Again, the particular reactants and products described herein are merely exemplary, and may vary from embodiment to embodiment.

In the embodiment shown in FIG. 2, chlor-alkali cell 208 receives sodium chloride and heavy water at one or more inlets, and provides a suitable electric potential to isolate chlorine and deuterium molecules at outlets to cell 208. The chemical process performed by this exemplary chlor-alkali cell 208 may be given as:

$$2NaCl + D_2O \rightarrow Cl_2 + D_2 + 2NaOD \quad (5)$$

As mentioned above, chlorine and deuterium is appropriately reacted at reactor/photoreactor 206 or in an appropriate catalytic chamber to re-create DCl fuel for laser 114. Similarly, peroxide generator 212 receives oxygen and water/heavy water through one or more inlets and applies a proper anode potential to oxidize the water/heavy water as follows:

$$2D_2O + 2O_2 \rightarrow 4D_2O_2 \quad (6)$$

The resulting peroxide is appropriately provided to drier 210, as discussed above.

The various components of RPS 108 may be combined or otherwise differently organized in any manner. Chlor-alkali cell 208 and peroxide generator 212 may be combined into a single processing cell, for example, as discussed below.

Figure 3:
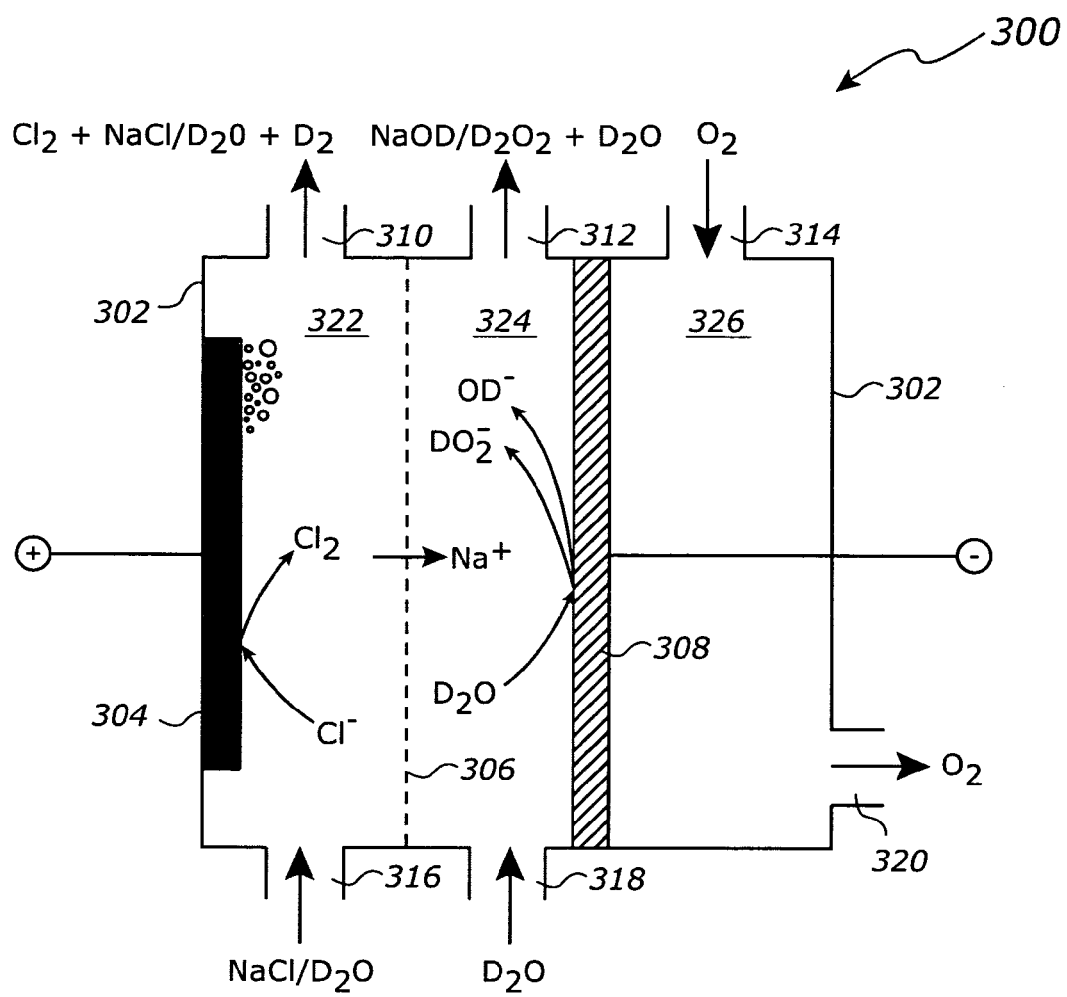
FIG. 3 is a schematic of an exemplary chlor-alkaline peroxide (CAP) cell suitable for use with a fuel regeneration system for a chemical oxygen iodine laser.

With reference now to FIG. 3, an exemplary single-chamber electrolytic cell 300 suitably includes an anode partition 322 and a cathode partition that includes a catholyte compartment 324 and a gas plenum 326 separated by a cathode 308. Alkali chloride received in anode partition 322 is appropriately electrolyzed at anode 304 to produce free chlorine and alkali ions, while oxygen is reduced at cathode 308 to produce base and peroxide. The anode and cathode partitions are appropriately separated by a membrane 306 that allows alkali ions to pass from anode partition 322 to the catholyte partition 324 while suppressing movement of hydroxide or hydroxide-d ions in the opposite direction.

Chemical reactions within electrolytic cell 300 suitably take place within a single chamber formed within a housing 302. Housing 302 is any material or combination of materials that is chemically inert, resistive to acidic and basic solutions, and that has a low coefficient of conductivity. Exemplary materials used in various embodiments of housing 302 include any type of plastic, ceramic or glass. Housing 302 is appropriately molded or otherwise formed to enclose the single chamber and to incorporate various inlets and outlets as described below. Electrolytic cells useful in various embodiments are widely used in various industrial and metallurgical processes, and are readily available from multiple commercial sources. Exemplary cells such as the model FM15000 cell are available from the ICI Group of London, England and others.

Anode partition 322 suitably includes an inlet 316, an outlet 310 and an anode electrode 304. Alkali chloride in aqueous solution is received through inlet 316 and electrolyzed at anode 304 to produce free chlorine gas as follows:

$$2NaCl \rightarrow 2Na^+ + Cl_2 + 2e^- \quad (7)$$

The free chlorine gas bubbles toward outlet 310, which leads to a drier (combined with or separate from drier 210 in FIG. 2) as appropriate. The chlorine gas produced may be relatively hot (e.g. on the order of 90° C.), and may contain water vapor and/or other impurities when exiting electrolytic cell 300. Additionally, excess alkali chloride solution may be present in outlet 310, which can be re-circulated to inlet 316 as appropriate.

Anode 304 is formed from any conducting material that is relatively inert and stable to corrosion such as titanium, aluminum or another metal. In an exemplary embodiment, anode 304 is a dimensionally stable anode formed of titanium with a ruthenium oxide coating ($Ti/RuO_2$), such as the DSA anodes available from Diamond Shamrock Technologies, S.A., of Geneva, Switzerland. Such an anode is a good catalyst for chlorine, having an overpotential on the order of about 50 millivolts, while having a much higher overpotential for oxygen, thus resulting in a relatively low amount of oxygen in the product stream.

Membrane 306 separates anode partition 322 from catholyte compartment 324 while allowing alkali metal ions (e.g. $Na^+$) and other cations (e.g. $D^+$ derived from electrolyzed heavy water) to pass from anode 304 to cathode 308. Membrane 306 may be implemented as any cation exchange material that has a low electrical resistance, that is stable to wet chlorine and other highly caustic solutions, and that allows alkali ions to pass while resisting hydroxide ion back migration from catholyte to anolyte. One example of such a membrane is a perflourinated sulfonic acid polymer that may be laminated or otherwise affixed to a carboxylate polymer. Suitable membranes are available from various commercial sources, including W. L Gore and Associates Inc. of Newark, Del., the DuPont Corporation and others.

The cathode partition suitably includes both a catholyte compartment 324 and gas plenum 326 separated by cathode 308. Oxygen that diffuses through cathode 308 is appropriately reduced at cathode 308 to produce hydroxide and peroxide ions as follows:

$$D_2O + O_2 + 2e^- \rightarrow O_2D^- + OD^- \qquad (8)$$

The ions produced by the oxidation process suitably combine with alkali ions that have passed through membrane 306 to produce sodium hydroxide-d and deuterium peroxide:

$$O_2D^- + OD^- + 2Na^+ + D_2O \rightarrow 2NaOD + D_2O_2 \qquad (9)$$

The AP solution combined with the spent BHP from the previous laser firing is provided to laser 202 (FIG.2) via output 312 in catholyte compartment 324.

Cathode 308 is any electrically conductive material capable of defining catholyte compartment 324 and gas plenum 326 within housing 302. Although gases such as oxygen and/or air may be allowed to permeate cathode 308 from plenum 326 to catholyte compartment 324, liquids in catholyte compartment 324 are prevented from entering plenum 326 through cathode 308. In an exemplary embodiment, cathode 308 is a gas diffusion cathode (GDC) that allows oxygen to pass through a porous yet hydrophobic material such as a carbon cloth. The carbon material may be coated with a layer of high surface area sintered carbon and/or a fluorocarbon bonding such as the TEFLON coating available from the DuPont Corporation of Wilmington, Del. Suitable gas diffusion cathodes may be obtained from various suppliers such as the E-Tek Corporation of Somerset, N.J.

Gas plenum 326 is any region within housing 302 adjacent to cathode 308 that is capable of maintaining a steady flow of gas such as air or oxygen. Plenum 326 suitably includes an inlet 314 and an outlet 320 whereby the gas is circulated and/or replenished as appropriate. In various embodiments, gas in plenum 326 is replenished with air via inlet 314, or with oxygen extracted from the surrounding air. As described above, oxygen diffuses through cathode 308 during the oxidation process to produce BHP in catholyte compartment 324.

In operation, then, electrolytic cell 300 receives aqueous alkaline salt (e.g. NaCl) at an inlet 316 to anode partition 322, water or heavy water at an input 318 to catholyte compartment 324 and air or oxygen at a gas input 314 to plenum 326. As an electric potential is applied between anode 304 and cathode 308, alkaline salt and water are electrolyzed at anode 304 to produce alkali ions, hydrogen or deuterium ions, and free chlorine. The free chlorine and hydrogen/deuterium bubbles to an outlet 310, where it is collected and ultimately passed to photoreactor 206 (FIG. 2). Alkali ions pass through membrane 306 to catholyte compartment 324, where oxygen is reduced at cathode 308 to produce hydroxide-d and peroxide-d ions. The ions produced at cathode 308 suitably combine with the alkali and deuterium ions in catholyte compartment 324 to produce alkali hydroxide-d, deuterium peroxide and heavy water that is collected at outlet 312 and ultimately provided to drier 210 (FIG. 2). Oxygen for the reduction process diffuses from plenum 326 through cathode 308 to catholyte compartment 324, as appropriate.

Exemplary reactions carried out within electrolytic cell 300 may have a threshold cell potential on the order of about 1.44 volts when sodium is the alkali metal used in the process. The overall stoichiometry for the processes carried out by electrolytic cell 300 when the alkali metal is sodium is:

$$2NaCl + 2D_2O + O_2 \rightarrow 2NaOD + D_2O_2 + Cl_2 \qquad (10)$$

which is the inverse of Equation 1 above. Alternatively, other alkali metals such as potassium, lithium and the like could be used in place of or in addition to sodium.

While at least one exemplary embodiment has been presented in the foregoing detailed description of the invention, it should be appreciated that a vast number of equivalent variations exist. For example, although the techniques and devices have been primarily described in conjunction with chemical oxygen ion lasers fueled with deuterium chloride and solid sodium peroxide, the invention is not so limited. Equivalent embodiments may process fuels formed from different alkali metals such as lithium, sodium or the like (as well as combinations of those metals), and may result in one or more different but equivalent fuels such as potassium peroxide, lithium peroxide, deuterium fluoride, hydrogen flouride, deuterium bromide, hydrogen bromide or the like. Further, the electrochemistry described herein could apply to various industrial processes that are equivalent to the COIL laser applications described herein. Moreover, the steps of the various chemical processes described herein may be practiced simultaneously, or in any temporal or spatial order. As such, the exemplary embodiments presented herein are intended as examples, and are not intended to limit the scope, applicability, or configuration of the invention in any way. Rather, the foregoing detailed description provides a convenient road map for implementing exemplary embodiments of the invention. Various changes may be made in the function and arrangement of steps or elements described in any of the exemplary embodiments without departing from the scope of the invention as set forth in the appended claims and their legal equivalents.

What is claimed is:

1. A laser system comprising:
   a fuel supply system configured to provide fuel products, wherein the fuel products comprise at least a solid fuel;
   a laser configured to receive the fuel products from the fuel supply system and to produce at least a solid waste product and a gaseous waste product from the fuel products; and
   a fuels regeneration system configured to receive the solid waste product at a solids processing system and the gaseous waste product at a gas processing system, and wherein each of the solid and gas processing systems cooperate with a reagent production system to replenish the fuel products in the fuel supply system.

2. The laser system of claim 1 wherein the solid fuel comprises a hydrogen halide.

3. The laser system of claim 2 wherein the fuel products further comprise a metal peroxide.

4. The laser system of claim 1 wherein the solid fuel comprises a deuterium halide.

5. The laser system of claim 4 wherein the fuel products further comprise a metal peroxide.

6. The laser system of claim 1 wherein the reagent production system comprises a chlor alkali portion configured to electrolyze a salt produced by the laser.

7. The laser system of claim 6 further comprising a peroxide generator.

8. The laser system of claim 7 wherein the peroxide generator is configured to receive heavy water from the gas processing system and to produce deuterium peroxide.

9. The laser system of claim 8 wherein the reagent production system further comprises a preactor configured to receive chlorine and deuterium from the chlor-alkali portion and to produce deuterium chloride therefrom.

10. The laser system of claim 7 wherein the peroxide generator is configured to receive water from the gas processing system and to produce hydrogen peroxide.

11. The laser system of claim 10 wherein the reagent production system further comprises a photoreactor configured to receive chlorine and hydrogen from the chlor-alkali portion and to produce hydrogen chloride therefrom.

12. The laser system of claim 1 wherein the laser is configured to process a metal peroxide and a deuterium halide to form a salt, heavy water and singlet delta oxygen.

13. The laser system of claim 1 wherein the laser is configured to process a metal peroxide and a hydrogen halide to form a salt, water and singlet delta oxygen.

14. A chemical oxygen iodine laser (COIL) system comprising:
a fuel supply system configured to provide fuel products, wherein the fuel products comprise metal peroxide and deuterium halide;
a COIL configured to receive the fuel products from the fuel supply system and to produce a solid waste product comprising metal halide and a gaseous waste product comprising oxygen and heavy water from the fuel products; and
a fuels regeneration system configured to receive the solid waste product at a solids processing system and the gaseous waste products at a gas processing system, and wherein each of the solid and gas processing systems cooperate with a reagent production system to replenish the fuel products in the fuel supply system, and wherein the reagent production system comprises a peroxide generator, an alkali processing cell and a reactor.

15. The COIL system of claim 14 wherein the peroxide generator is configured to receive the oxygen and heavy water from the gas processing system and to produce peroxide therefrom.

16. The COIL system of claim 15 wherein the alkali processing cell is configured to receive the metal halide and to produce deuterium halide therefrom.

17. The COIL system of claim 16 wherein the reactor is a photoreactor configured to receive deuterium and halide from the alkali cell and to produce deuterium halide therefrom.

18. The COIL system of claim 16 wherein the alkali processing cell and the peroxide generator are provided within a common housing, and wherein the alkali processing cell is separated by the peroxide generator by a membrane.

19. A fuel regeneration system (FRS) for recovering solid and gaseous fuels for a laser, the FRS comprising:
a solids processing system configured to receive solid waste from the laser and to separate at least a portion of the solid fuels from the solid waste;
a gas processing system configured to receive gaseous waste from the laser and to separate at least a portion of the gaseous fuels from the gaseous waste; and
a reagent production system coupled to the solids processing system and the gas processing system to receive remaining solid and gaseous waste, respectively, wherein the reagent production system is configured to process the remaining solid and gaseous waste to thereby regenerate the solid and gaseous fuels for the laser.

20. The FRS of claim 19 wherein the solid fuels comprise metal peroxide.

21. The FRS of claim 20 wherein the remaining solid waste comprises a metal hydride.

22. The FRS of claim 21 wherein the remaining gaseous waste comprises oxygen and water.

23. The FRS of claim 21 wherein the remaining gaseous waste comprises oxygen and heavy water.

24. A method of operating a solid generator laser system having a laser and a fuel supply system, the method comprising the steps of:
providing a solid fuel and a gaseous fuel from the fuel supply system to the laser;
firing the laser to thereby convert at least a portion of the solid fuel and at least a portion of the gaseous fuel to waste products, wherein the waste products comprise a solid portion and a gaseous portion;
recovering the solid and gaseous portions from the laser; and
processing the solid and gaseous portions of the waste products to regenerate the solid fuel and the gaseous fuel therefrom.

25. The method of claim 24 wherein the solid fuel comprises a metal peroxide and the gaseous fuel comprises a halide.

26. The method of claim 25 wherein the solid portion of the waste products comprises metal halide and wherein the gaseous portion comprises oxygen and heavy water.

27. The method of claim 26 wherein the processing step comprises the step of electrolyzing the metal halide to restore the halide.

28. The method of claim 27 wherein the processing step further comprises the step of oxidizing heavy water to produce peroxide.

29. The method of claim 25 wherein the solid portion of the waste products comprises metal halide and wherein the gaseous portion comprises oxygen and water.

30. The method of claim 29 wherein the processing step comprises the step of electrolyzing the metal halide to restore the halide.

31. The method of claim 30 wherein the processing step further comprises the step of oxidizing heavy water to produce peroxide.

32. A solid generator laser system having a laser and a fuel supply system, the laser system further comprising:
means for providing a solid fuel and a gaseous fuel from the fuel supply system to the laser;
means for firing the laser to thereby convert at least a portion of the solid fuel and at least a portion of the gaseous fuel to waste products, wherein the waste products comprise a solid portion and a gaseous portion;
means for recovering the solid and gaseous portions from the laser; and
means for processing the solid and gaseous portions of the waste products to regenerate the solid fuel and the gaseous fuel therefrom.

* * * * *